United States Patent [19]

Umeha et al.

[11] Patent Number: 4,644,912
[45] Date of Patent: Feb. 24, 1987

[54] CAM SHAFT AND METHOD OF MANUFACTURE

[75] Inventors: Genkichi Umeha, Tokyo; Shigeru Urano, Saitama; Osamu Hirakawa, Saitama; Shunsuke Takegushi, Saitama, all of Japan

[73] Assignee: Nippon Piston Ring Co., Ltd., Tokyo, Japan

[21] Appl. No.: 691,838

[22] Filed: Jan. 16, 1985

[30] Foreign Application Priority Data

Jan. 20, 1984 [JP] Japan ................................. 59-7032

[51] Int. Cl.$^4$ ............................................. F01L 1/46
[52] U.S. Cl. ............................. 123/90.34; 123/90.6; 74/567
[58] Field of Search ............... 123/90.6, 90.33, 90.34, 123/90.17; 74/567

[56] References Cited

U.S. PATENT DOCUMENTS

| 1,469,063 | 9/1923 | Wills | 123/90.34 X |
| 1,590,073 | 6/1926 | Birkigt | 123/90.34 X |
| 1,684,955 | 9/1928 | Goodwin | 123/90.34 X |
| 2,888,837 | 6/1959 | Hellman | 123/90.17 X |
| 4,332,222 | 6/1982 | Papez | 123/90.17 |

Primary Examiner—William R. Cline
Assistant Examiner—Peggy A. Neils
Attorney, Agent, or Firm—Finnegan, Henderson, Farabow, Garrett & Dunner

[57] ABSTRACT

A hollow cam shaft of the type wherein lubricating oil is distributed to the cam portions includes a rod member positioned inside the shaft pipe member and spaced from the inner pipe surface by shaft end members and guide strips to form a reduced, annular volume to be filled with oil during engine start-up. The method of making the hollow cam shaft includes forming the rod member from a resinous material by injection molding, using a removable mold positioned in the pipe through-hole, and, in a preferred embodiment, flowing the resin through the mold cavity and into a recess located in the distal shaft end member, which recess has an enlarged portion for capturing the hardened resin rod end and facilitating mold removal.

12 Claims, 6 Drawing Figures

CAM SHAFT AND METHOD OF MANUFACTURE

BACKGROUND OF THE INVENTION

1. Field of the Invention

The present invention relates, in general, to hollow cam shafts, and particularly to cam shafts capable of supplying lubricating oil to the cam portions and the journal portions of the shaft.

2. Description of the Relevant Art

Hollow pipe members have been used as cam shafts for internal combustion engines in order to decrease weight. However, because the through-hole of the hollow pipe member typically has a large volume, it takes a long time to fill the hole with lubricating oil upon starting the engine. Thus, use of this kind of conventional hollow cam shaft is likely to result in initial scuffing due to the shortage of the lubricating oil in the through-hole during starting.

In order to obviate this drawback of conventional hollow cam shafts, the present invention is intended to provide an improved hollow cam shaft which can prevent initial scuffing due to the shortage of lubricating oil during starting.

SUMMARY OF THE INVENTION

In accordance with the present invention, as embodied and broadly described herein, the hollow cam shaft of the present invention, being of the type wherein lubricating oil is distributed to the cam portions through the hollow shaft, comprises a pipe member having a longitudinal axis and a through-hole along the axis. The pipe member has an inner cylindrical surface to be contacted by the lubricating oil, and means for reducing the volume of the through-hole accessible to the lubricating oil. The volume reducing means includes a rod member positioned in the pipe member through-hole, the rod member being formed of a lightweight material compatible with lubricating oil and having an outer diameter less than the diameter of the through-hole. The reducing means further includes means for spacing the rod member from the pipe member inner surface along the longitudinal axis. The cam shaft further includes conduit means extending through the pipe member inner surface for connecting the cam portions and the portion of the pipe member through-hole adjacent the inner cylindrical surface.

Preferably, the rod member is fabricated from a resinous material of the type that can be injection molded, and has a through-hole along the rod member axis.

It is also preferred that the spacing means include a pair of end members attached to the pipe member at respective axial ends thereof, each of the pair having a recess formed therein. The recess is sized for receiving the respective axial end of the rod member, and is located to space the rod member from the inner cylindrical surface.

It is further preferred that the spacing means include at least one guide strip surrounding the rod member and spaced along the rod member axis at an axial location that will reduce vibration when the shaft is rotated.

The method of the present invention for fabricating a hollow cam shaft of the type wherein lubricating oil is distributed to the cam portions through the hollow shaft, comprises the steps of selecting a pipe member having a longitudinal axis, a through-hole along the axis, and an inner cylindrical wall; selecting a mold having a longitudinal axis and a cylindrical mold cavity oriented along the mold axis, the outer diameter of the cavity being less than the inner diameter of the pipe member; inserting the mold into the through-hole of the pipe member; injecting a liquid resinous material into the mold cavity; and then withdrawing the mold after the resinous material has hardened.

Preferably, the pipe member has an end member with a recess communicating with the cavity of the inserted mold and the recess has an enlarged diameter portion and a smaller diameter portion. In this case, the injecting step includes the steps of flowing the resinous material from the cavity, through the smaller diameter portion, and into the enlarged diameter portion, for preventing withdrawal of the hardened resin rod during the mold removal step.

The accompanying drawings, which are incorporated in, and constitute a part of this specification, illustrate several embodiments of the invention and, together with the description, serve to explain the principles of the invention. dr

DESCRIPTION OF THE PREFERRED EMBODIMENTS

Preferred embodiments of the present invention will now be explained referring to enclosed drawings.

Figure 1:
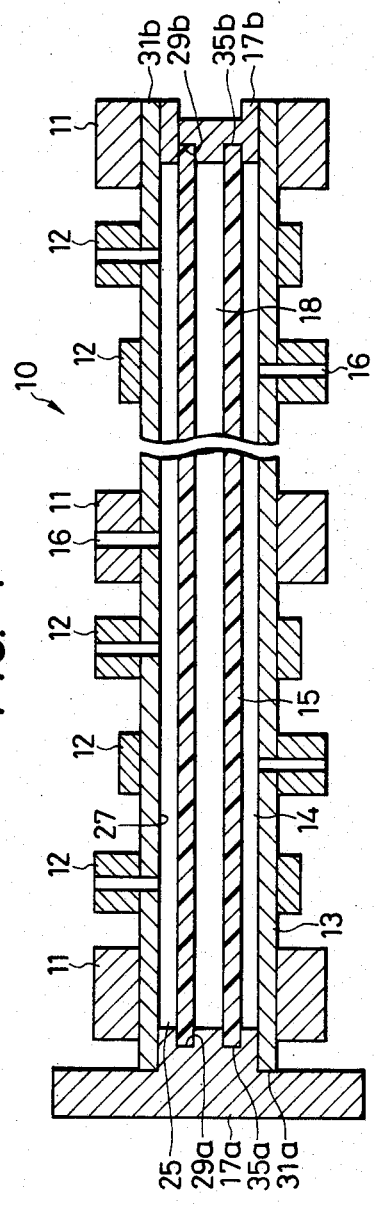
FIG. 1 is a longitudinal cross section showing one embodiment of a cam shaft made according to the present invention.

With initial reference to FIG. 1, a cam shaft according to the present invention is designated generally by the numeral 10 and includes pipe member 13 having through-hole 25 extending along the pipe member longitudinal axis, pipe member 13 also having inner cylindrical surface 27. A rod 15 formed of a lightweight material such as a hardened resin is located in through-hole 25 and positioned therein in a manner such that annular space 14 is formed between inner cylindrical surface 27 of pipe member 13 and an outer wall of the rod 15. Shaft end members 17a, 17b are provided at ends 31a, 31b of pipe member 13. End members 17a, 17b are each configured to engage the respective ends of pipe member 13 and include recesses 29a, 29b sized and shaped so as to fit ends 35a, 35b of rod 15, as shown in FIG. 1.

The rod 15 shown in FIG. 1 can be formed by injection molding a hardenable liquid resin as will be described later. Rod 15 preferably has a through-hole 18 passing therein longitudinally. An annular space 14 is formed between the inner surface 27 of pipe member 13 and the outer wall of rod 15. This annular space acts as a lubricating oil path. The volume of annular lubricating oil path 14 is designed to be smaller than the total volume of the through-hole of the hollow pipes used in conventional hollow cam shafts, so that the lubricating oil can quickly fill the lubricating oil path 14 after starting the engine and flow to the journal members and cam members, to be discussed henceforth.

An can be seen in FIG. 1, a plurality of journal members 11 and cam member 12 are fixedly fitted onto the outer periphery of pipe member 13. Each of the journal members 11 and the cam members 12 are provided with lubricating oil inlet/outlet conduit 16 which is in communication with lubricating oil path 14 so as to allow the flow of lubricating oil in or out of the lubricating oil path 14. Hollow cam shafts are typically supplied with lubrication oil through one or more journal members, whereupon the oil flows through the through-hole and to the cam members and other journal members.

Opposite ends 31a, 31b of pipe member 13 and ends 35a, 35b of rod 15 are fitted into the respective shaft end members 17a, 17b. One of the shaft end members, for example the member 17a disposed at the left hand in FIG. 1, may be a pulley, and the other, for example the member 17b at the right hand in FIG. 1, may be a cap, preferably.

Another embodiment of the cam shaft of the present invention will be described referring to FIGS. 2(a) and 2(b). In this embodiment, designated generally by the numeral 100, elements of the cam shaft identical to those discussed in relation to the FIG. 1 embodiment have been designated by the same numerals. Cam shaft 100 includes rod 105 having a solid cross section and with ends 135a, 135b, which rod also can be formed by injection molding a resinous material. Cam shaft 100 further includes at least one guide strip 109 surrounding rod 105 and disposed between the inner surface 27 of pipe member 13 and the outer wall of the rod 105. The remaining elements in this embodiment, except for shaft end members 117a, 117b, are constructed in the same manner as those in the first embodiment. Guide strips 109 are located along the longitudinal axis so as to prevent pipe member 13 and rod 105 from vibrating during operation when the shaft is rotated, as would be understood by one skilled in the art.

Figure 2B:
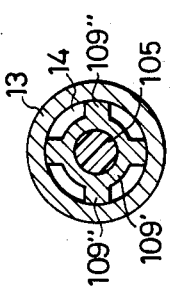
FIG. 2(b) is a cross section of the cam shaft shown in FIG. 2(a), viewed from line A—A in FIG. 2(a)

Preferably, the guide strip 109 includes, as shown in FIG. 2(b), an annular body 109' and two pairs of projection members 109" protruding from, and symmetrically spaced about, the annular body 109'. Parts of the lubricating oil path 14 are formed by areas surrounded by the outer wall of the annular body 109', side walls of the projection members 109" and the inner surface of pipe member 13. Guide strip 109 should be made of a material that it is not likely to be deformed when mounted in the lubricating oil path 14 nor damaged by the lubricating oil flowing in the path 14.

The rods 15 and 105 shown in FIGS. 1 and 2(a), respectively, can be formed of a resinous material by injection molding using a method described below. As shown in FIG. 3, mold 210 is first inserted into through-hole 25 of the pipe member 13. Mold 210 has a cylindrical cavity 221 aligned with the mold axis, and cavity 221 has a diameter less than the diameter of through-hole 25. Then, melted resin 214 is injected into cavity 221 from a nozzle 212 provided on injection molding machine 211. After the resin has hardened, mold 210 is pulled out of pipe member 13 to thereby form the resin rod. The resin rod formed by injection molding by using the mold 210 of FIG. 3 is one having a through-hole therein.

Figure 4:
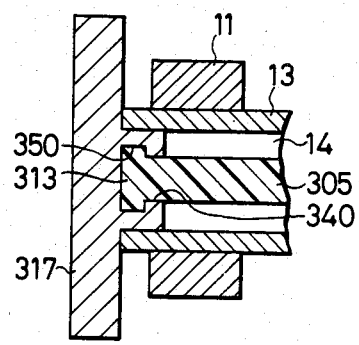
FIGS. 4 and 5 are longitudinal cross sections showing modified examples of shaft end portions of a cam shaft according to the present invention.
Figure 5:
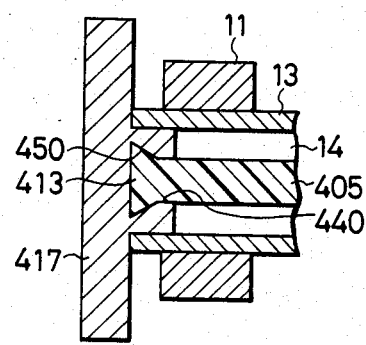

In case of injection molding the rod, a shaft end member can preferably be attached at the end of the pipe member distant the filling machine. Also, the shaft end can have a recess portion communicating with the mold cavity when the mold is inserted for forming the rod end in the recess. If the shaft end member is further designed so as to form a large diameter recess portion therein, mold withdrawal will be facilitated. As shown in FIGS. 4 and 5 which are details of variations of the embodiment shown in FIG. 2(a), large diameter portions 313 and 413 of the resin rods 305 and 405, respectively, can be captured by appropriately contructed corresponding shaft end members 317 and 417. End members 317 and 417 have respective small diameter recess portions 340 and 440, and respective enlarged recess portions 350 and 450. During injection, the liquid resin flows from the molding machine, through the mold cavity, through the small diameter recess portions, and into the enlarged recess portions when it can harden.

Figure 2A:
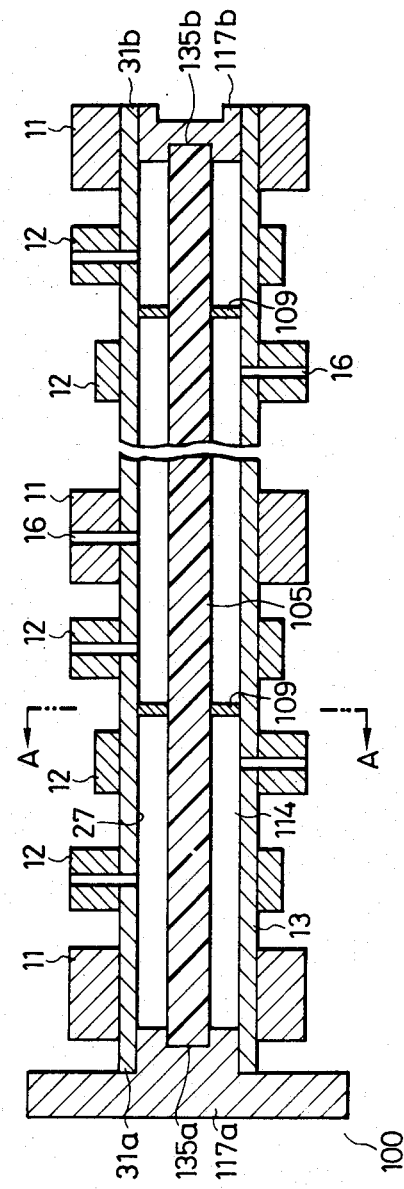
FIG. 2(a) is a longitudinal cross section showing another embodiment of a cam shaft made according to the present invention.
Figure 3:
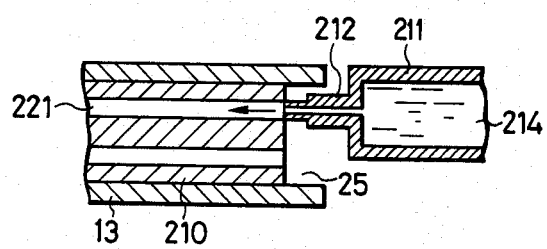
FIG. 3 is a longitudinal cross section of a cam shaft and an injection molding machine showing the method of the present invention for forming a resin rod by injection molding.

Thus, in the FIG. 4 and FIG. 5 variations of the FIG. 2(a) embodiment, the resin rods 305 and 405 can be prevented from being pulled out of pipe member 13 together with the mold (not shown) when the mold is pulled out of pipe member 13 after completion of the injection molding and hardening steps. The examples of forming the enlarged diameter portions 313 and 413 shown in FIGS. 4 and 5, respectively, are shown applied to a rod having no through-hole, but it is also possible to design the respective shaft end portions so as to form an enlarged diameter recess portion therein for accepting a rod having a through-hole.

As described above, according to the present invention, a lubricating oil path formed between the inner surface of a pipe member having a through-hole and the outer wall of a rod positioned in the through-hole have a volume smaller than a volume of a through-hole of a hollow pipe member used in conventional cam shafts. Hence, the lubricating oil supplied through the lubricating oil inlet/outlet conduits formed in the journal portions and the cam portions of the cam shaft can be filled with lubricating oil promptly after the start of the engine. Thus, initial scuffing normally occurring at the start of the engine due to the shortage of lubricating oil in conventional cam shafts can be prevented by using the cam shafts of the present invention.

Further, the lightweight rod element of the present cam shaft invention may be constructed so as to have a through-hole therein such as through-hole 18 in rod 15 in FIG. 1. The rod thus can be made lighter in weight than a rod having no through-hole, resulting in further corresponding weight savings in the cam shaft.

It will be apparent to those skilled in the art that various modifications and variations could be made in the cam shafts of the invention without departing from the scope or spirit of the invention.

What is claimed is:

1. A hollow cam shaft of the type wherein lubricating oil is distributed to the cam portions through the hollow shaft, the shaft comprising:

a pipe member having a longitudinal axis and a through-hole along said axis, said pipe having an inner cylindrical surface to be contacted by the lubricating oil;

means for reducing the volume of said through-hole accessible to the lubricating oil, said reducing means including (i) a rod member positioned in the pipe member through-hole at a fixed axial location with respect to said pipe member, said rod member being formed of a lightweight material compatible with lubricating oil and having an outer surface with a diameter less than the diameter of said through-hole, the volume of lubricating oil in said pipe member being reduced by the volume enclosed by the outer surface of said rod member, and (ii) means for spacing said rod member from said pipe member inner surface along said longitudinal axis; and conduit means extending through said pipe member inner surface for connecting the cam portions and the portion of said pipe member through-hole adjacent the inner cylindrical surface.

2. The cam shaft as in claim 1 wherein said rod member is fabricated from a resinous material of the type that can be injection molded.

3. The cam shaft as in claim 1 wherein said rod member has a longitudinal axis and a through-hole along said rod member axis said rod member through-hole being inaccessible to the lubricating oil.

4. The cam shaft as in claim 1 wherein said spacing means includes a pair of end members attached to said pipe member at respective pipe member axial ends, each of said pair having a recess formed therein, said recess being sized for receiving the respective axial end of said rod member and being located to space said rod member from said inner cylindrical surface.

5. The cam shaft as in claim 4 including means for preventing relative axial movement between one end of said rod member and the respective one of said end members.

6. The cam shaft as in claim 5 wherein said preventing means includes said one rod member end having an enlarged portion the diameter of which is greater than said rod member outer diameter, and wherein said respective end member recess has a complementary enlarged portion.

7. The cam shaft as in claim 1 wherein said spacing means includes at least one guide strip surrounding said rod member and spaced along the rod member axis.

8. The cam shaft as in claim 7 wherein said guide strip includes an annular body surroundingly contacting said rod member and a plurality of members radially projecting from said body and contacting said pipe member inner surface.

9. The cam shaft as in claim 7 wherein said guide strip is positioned at an axial location that will reduce vibration when the shaft is rotated.

10. A hollow cam shaft of the type wherein lubricating oil is distributed to the cam portions through the hollow shaft, the shaft comprising:

a pipe member having a longitudinal axis and a through-hole along said axis, said pipe having an inner cylindrical surface to be contacted by the lubricating oil;

means for reducing the volume of said through-hole accessible to the lubricating oil, said reducing means including (i) a rod member positioned in the pipe member through-hole at a fixed axial location with respect to said pipe member, said rod member being of a lightweight material compatible with lubricating oil and having an outer surface with a diameter less than the diameter of said through-hole, the volume of lubricating oil in said pipe member being reduced by the volume enclosed by the outer surface of said rod member, and (ii) means for spacing said rod member from said pipe member inner surface along said longitudinal axis; and conduit means extending through said pipe member inner surface for connecting the cam portions and said pipe member through-hole, wherein said spacing means includes a pair of end members attached to said pipe member at respective pipe member axial ends, each of said pair having a recess formed therein, said recess being sized for receiving the respective axial end of said rod member, and located to space said rod member from said inner cylindrical surface; and wherein said spacing means includes at least one guide strip surrounding said rod member and spaced along the rod member axis.

11. The cam shaft as in claim 10 wherein said guide strip includes an annular body surroundingly contacting said rod means and a plurality of members radially projecting from said body and contacting said pipe member inner surface.

12. The cam shaft as in claim 10 wherein said guide strip is positioned at an axial location that will reduce vibration when the shaft is rotated.

* * * * *